Oct. 6, 1942. J. A. WOOLERY 2,297,850

OIL-LEVEL MEASURING STICK

Filed Dec. 6, 1939

Joseph A. Woolery.
INVENTOR
ATTORNEY

Patented Oct. 6, 1942

2,297,850

UNITED STATES PATENT OFFICE 2,297,850

OIL-LEVEL MEASURING STICK

Joseph A. Woolery, Seattle, Wash.

Application December 6, 1939, Serial No. 307,824

5 Claims. (Cl. 33—126.7)

This invention relates to improvements in measuring-sticks for indicating, to the operator of a motor vehicle, the level of the oil in the crank case, and for its general object is directed to the provision of an instrument which will obviate the presently required preliminary steps of removing the stick from the crank-case and wiping the same before taking an actual reading of the oil level.

In clarification, it may be here stated that measuring sticks as now used are comprised simply of a rod having oil-level indications on the side and arranged to be inserted through the wall of the crank-case into the oil basin, the necessity for removing the stick and wiping the same preliminary to an oil check arising from the fact that misting of the oil incident to motor operation causes an oil film to appear on the stick throughout substantially its entire length.

In accomplishing my above object, and other and more particular objects and advantages the nature of which will appear in the course of the following description and claims, the invention consists in the employment of a measuring stick in association with a sheath functioning by the exclusion of misting to preclude an oil film appearing on the stick above the true liquid level within the crank-case, and further consists in the novel construction and in the adaptation and combination of parts hereinafter described and claimed.

Figure 1:
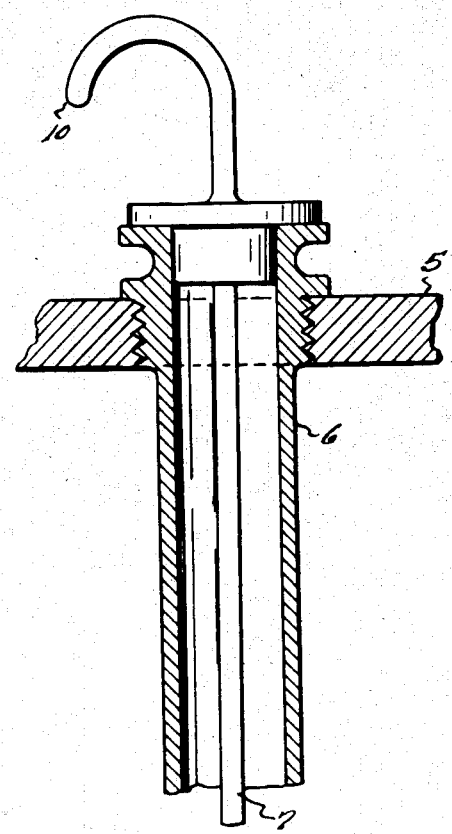
Figure 1 is a transverse vertical sectional view of the now preferred embodiment of the invention and indicating fragmentarily therewith a portion of the wall of a crank-case through which the instrument is introduced to the oil basin.
Figure 1:
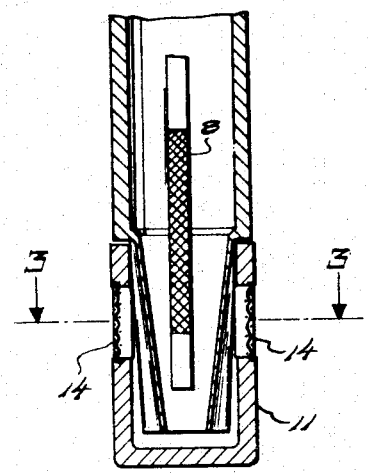
Figure 3:
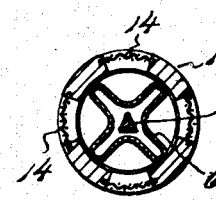
Fig. 3 is a horizontal section on line 3—3 of Fig. 1.
Figure 2:
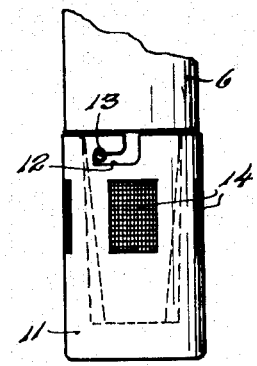
Fig. 2 is a fragmentary side elevational view of the bottom part of the instrument.

Referring by numeral to the illustrated embodiment, 5 denotes the head wall of a motor crank-case and through a suitable aperture therein I introduce a removable pipe, as 6, which at its lower end is desirably crimped to define a plurality of convergingly disposed vertical grooves lying at spaced intervals about the circumference. The pipe, with its fluted dependency, extends into proximity of the lower limits of the oil basin and functions as a housing for the measuring-stick which I indicate by 7, the stick being of ordinary design having a roughened surface 8 on which the oil level is visible and providing, at its upper end, an exposed hook or the like 10 for withdrawal purposes.

Fitting over said fluted dependency of the pipe 6 is a cup 11 detachably mounted through means such, for example, as the illustrated bayonet slots 12 working over pins 13 provided at diametrically opposite sides of the pipe, and characterizing this cup are screened openings, as 14, which lie above the lower limits of the pipe and function as communicating ports between the crankcase of the motor and the interior of the pipe.

As will, it is believed, be obvious, the arrangement is one in which the lower lip of the pipe acts with the cup to provide a liquid trap sealing the instrument against admission of misted oil to the stick compartment. It will be further apparent that the invention serves the added office of preventing foreign particles, which very frequently are of a gritty nature, from being introduced on the measuring-stick into the crankcase oil with consequent danger to the bearing surfaces of the motor, these foreign particles, in the use of my instrument, collecting in the cup 11 wherefrom the same may be removed at intervals by withdrawing the pipe 6 from the crankcase.

It is of course obvious that modifications may be resorted to and I therefore intend that no limitations be implied by reason of having illustrated and described a particular embodiment. It is expected that the hereto annexed claims will be given an interpretation in their scope commensurate with the degree to which the art is advanced.

What I claim is:

1. In an instrument for measuring the oil level within the oil basin of an internal combustion engine, the combination of an indicating stick, a pipe arranged to extend into the basin below the low-level line of the oil therein and serving as a housing for the stick, and a cup fitting over the lower end of said pipe and acting therewith to provide trap-flow communication between the basin and the interior of the pipe for liquid-sealing the latter against admission of misted oil from the basin.

2. In an instrument for measuring the oil level within the oil basin of an internal combustion engine, the combination of an indicating stick, a pipe open at its lower end and arranged to extend into the basin below the low-level line of the oil therein to serve as a housing for the stick, said pipe being removable, and a cup detachably received over the lower end of the pipe characterized in that the same provides a space between the cup and the pipe and has wall openings by which communication is had from the oil basin to said space and thence under the lower lip of the pipe into the interior of the latter, said wall openings, in the assembled position of the cup, being located above the lower lip of the pipe whereby to obtain a trap-flow between said basin and the interior of the pipe for liquid-sealing the latter against admission of misted oil from the basin.

3. A measuring instrument according to claim 2 providing means for screening the oil passing the trap.

4. A measuring instrument according to claim 2 wherein the space which surrounds the pipe and leads from the wall openings to the lower lip of the pipe is divided at circumferentially spaced intervals to define separated flow channels.

5. In an instrument for measuring the oil level in the oil basin of an internal combustion engine, the combination of an indicating stick, and a housing therefor arranged to extend into said oil basin below the oil level therein and having at its lower end, a conduit leading from the oil basin to the interior of the housing characterized in that the same, by a down travel from the basin provides trap-flow communication and thereby liquid-seals the interior of the housing against admission of misted oil from the basin.

JOSEPH A. WOOLERY.